United States Patent [19]

Glass et al.

[11] Patent Number: 4,547,475

[45] Date of Patent: Oct. 15, 1985

[54] MAGNESIUM HALIDE CATALYST SUPPORT AND TRANSITION METAL CATALYST PREPARED THEREON

[75] Inventors: Sarah M. Glass, Richwood; Morris S. Edmondson, Alvin, both of Tex.

[73] Assignee: The Dow Chemical Company, Midland, Mich.

[21] Appl. No.: 648,423

[22] Filed: Sep. 7, 1984

[51] Int. Cl.$^4$ .......................... C08F 4/62; C08F 4/64; C08F 4/63
[52] U.S. Cl. ...................... 502/115; 502/119; 502/128; 502/226; 526/125
[58] Field of Search ............. 502/115, 119, 128, 226

[56] References Cited

U.S. PATENT DOCUMENTS

| | | | |
|---|---|---|---|
| 4,172,050 | 10/1979 | Gessell | 252/431 R |
| 4,250,288 | 2/1981 | Lowery, Jr. et al. | 526/137 |
| 4,314,912 | 2/1982 | Lowery et al. | 502/115 |
| 4,487,846 | 12/1984 | Bailly et al. | 502/115 X |

*Primary Examiner*—Patrick P. Garvin
*Attorney, Agent, or Firm*—J. G. Carter

[57] ABSTRACT

An improved magnesium halide catalyst support is prepared by combining a magnesium component represented by the general formula $R_2Mg \cdot xAlR'_3$ wherein R is a hydrocarbyl or a hydrocarbyloxy group; R' is a halide, hydrocarbyl, a hydrocarbyloxy, a carboxyl or an acyl group; and x has a value such that the atomic ratio of Al:Mg is 0.025:1 to 0.25:1 with a non-metallic halide source under conditions such that the reaction temperature does not exceed 60° C.

24 Claims, No Drawings

MAGNESIUM HALIDE CATALYST SUPPORT AND TRANSITION METAL CATALYST PREPARED THEREON

BACKGROUND OF THE INVENTION

The present invention pertains to magnesium halide catalyst supports, catalysts prepared therefrom and a process for polymerizing olefins in the presence of such catalysts.

Magnesium halide catalyst supports have been previously prepared by reacting a halide source with magnesium components represented by the formula $R_2Mg \cdot xAlR_3$ wherein x has a value from 0.001 to 10 (U.S. Pat. No. 4,250,288).

It has now been discovered that when α-olefins are polymerized in the presence of supported transition metal catalysts wherein the support is prepared from the aforementioned magnesium component wherein the atomic ratio of Al:Mg is from about 0.025:1 to about 0.25:1 and wherein said magnesium component is combined with a halide source under conditions such that the reaction temperature does not exceed about 60° C. that the efficiency of the resultant catalyst is much improved.

SUMMARY OF THE INVENTION

One aspect of the present invention pertains to an improvement in a catalyst support prepared by contacting a hydrocarbon soluble magnesium component represented by the formula $R_2Mg \cdot xAlR'_3$ with a halide source wherein the improvement resides in (1) employing as the magnesium component, one wherein the value of x is such that the atomic ratio of Al:Mg is from about 0.025:1 to about 0.25:1, preferably from about 0.025:1 to about 0.125:1 and (2) the magnesium component and the halide source are contacted in such a manner that the reaction temperature does not exceed about 60° C., preferably does not exceed about 25° C., most preferably does not exceed about 10° C.

Another aspect of the present invention concerns an improvement in magnesium halide supported transition metal catalysts comprising a magnesium halide and a transition metal component wherein the improvement resides in employing as the magnesium halide support that which is prepared by contacting a magnesium component represented by the formula $R_2Mg \cdot xAlR'_3$ wherein each R is independently a hydrocarbyl or a hydrocarbyloxy group; each R' is independently a halide, a hydrocarbyl or hydrocarbyloxy group having from 1 to about 20, preferably from 1 to about 10 carbon atoms,

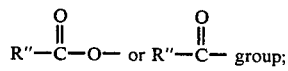

R" is a hydrocarbyl or a hydrocarbyloxy group having from 1 to about 20, preferably from 1 to about 10 carbon atoms; x has a value such that the atomic ratio of Al:Mg is from about 0.025:1 to about 0.25:1, preferably from about 0.025:1 to about 0.125:1 with a halide source in a manner such that the reaction temperature does not exceed 60° C., preferably such that the temperature does not exceed about 25° C. and most preferably does not exceed about 10° C.

The present invention also concerns a catalyst composition comprising the product which results from combining (A) a magnesium halide prepared by contacting
  (1) at least one hydrocarbon soluble magnesium component represented by the general formula $R_2Mg \cdot xAlR'_3$ wherein each R is independently a hydrocarbyl or a hydrocarbyloxy group having from 1 to about 20, preferably from 1 to about 10 carbon atoms, each R' is independently a halide, a hydrocarbyl or hydrocarbyloxy group having from 1 to about 20, preferably from 1 to about 10 carbon atoms,

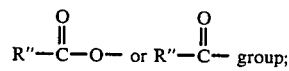

R" is a hydrocarbyl or a hydrocarbyloxy group having from 1 to about 20, preferably from 1 to about 10 carbon atoms; and x has a value such that the atomic ratio of Al:Mg is from about 0.025:1 to about 0.25:1, preferably from about 0.025:1 to about 0.125:1; and
  (2) at least one non-metallic or metallic halide source under conditions such that the reaction temperature does not exceed about 60° C., preferably does not exceed about 25° C. and most preferably does not exceed about 10° C.;
(B) at least one transition metal compound represented by the formula $Tm(OR)_yX_{y-x}$ wherein Tm is a metal of Groups IVB, VB, VIB, VIIB or VIII of the Periodic Table; R is a hydrocarbyl group having from 1 to about 20, preferably from 1 to about 10 carbon atoms or a

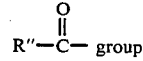

wherein R" is a hydrocarbyl or a hydrocarbyloxy group having from 1 to about 20, preferably from 1 to about 10 carbon atoms; x and y each independently have values from zero up to the valence of Tm and x+y has a value equal to the valence of Tm;
(C) an additional halide source if an insufficient quantity of component (A2) is present to provide the desired excess X:Mg ratio;
(D) an organoaluminum compound, if components (A-1) and (C) are not present in quantities sufficient to provide the desired Al:Tm ratio; and wherein
  (1) the Mg:Tm atomic ratio is from about 2:1 to about 200:1, preferably from about 5:1 to about 70:1, most preferably from about 10:1 to about 50:1,
  (2) the Al:Tm atomic ratio is from about 0.1:1 to about 200:1, preferably from about 1:1 to about 50:1, most preferably from about 5:1 to about 30:1; and
  (3) excess X:Mg ratio is from about 0.001:1 to about 100:1, preferably from about 0.01:1 to about 50:1, most preferably from about 0.1:1 to about 5:1.

The term excess X is defined as that amount of halide above the amount necessary to convert the R groups attached to a magnesium atom in component (A) to a halide.

The present invention also pertains to a process for polymerizing α-olefins which comprises conducting the polymerization in the presence of the aforementioned improved catalyst.

DETAILED DESCRIPTION OF THE INVENTION

Suitable magnesium components which can be employed herein include, for example, those represented by the general formula $R_2Mg.xAlR'_3$ wherein each R is independently a hydrocarbyl or hydrocarbyloxy group having from 1 to about 20, preferably from 1 to about 10 carbon atoms, each R' is independently a halide, a hydrocarbyl or hydrocarbyloxy group having from 1 to about 20, preferably from about 1 to about 10 carbon atoms,

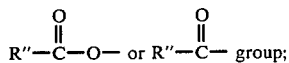

R" is a hydrocarbyl or a hydrocarbyloxy group having from 1 to about 20, preferably from 1 to about 10 carbon atoms; and x has a value such that the atomic ratio of Al:Mg of from about 0.025:1 to about 0.25:1, preferably from about 0.025:1 to about 0.125:1.

Particularly suitable organomagnesium compounds which can be employed to form such magnesium component include, for example, n-butyl-sec-butyl magnesium, diisopropyl magnesium, di-n-hexyl magnesium, isopropyl-n-butyl magnesium, ethyl-n-hexyl magnesium, ethyl-n-butyl magnesium, di-n-octyl magnesium, butyl-octyl magnesium and others wherein the alkyl has from 1 to 20 carbon atoms. Exemplary suitable magnesium diaryls include diphenylmagnesium, dibenzylmagnesium, and ditolylmagnesium. Suitable organomagnesium compounds also include magnesium alkoxides and aryloxides and aryl and alkyl magnesium halides with the halogen-free organomagnesium compounds being more desirable.

Suitable aluminum compounds which can be employed to prepare the magnesium component includes, for example, triethylaluminum, triisobutylaluminum, trimethylaluminum, tri-n-butylaluminum, diethylaluminum ethoxide, ethylaluminum sesquichloride, diethylaluminum chloride, diethylaluminum octoate, ethylaluminum chloride octoate, ethylaluminum ethoxide chloride, mixtures thereof and the like.

The magnesium components are formed immediately upon admixing an organomagnesium compound and an aluminum compound, preferably in a hydrocarbon medium.

Among the halide sources which can be employed herein are the active non-metallic halides and metallic halides.

Suitable non-metallic halides are represented by the formula R'X wherein R' is hydrogen or an active monovalent organic radical and X is a halogen. Particularly suitable non-metallic halides include, for example, hydrogen halides and active organic halides such as t-alkyl halides, allyl halides, benzyl halides and other active hydrocarbyl halides wherein hydrocarbyl is as defined hereinbefore. By an active organic halide is meant a hydrocarbyl halide that contains a labile halogen at least as active, i.e., as easily lost to another compound, as the halogen of sec-butyl chloride, preferably as active as t-butyl chloride. In addition to the organic monohalides, it is understood that organic dihalides, trihalides and other polyhalides that are active as defined hereinbefore are also suitably employed. Examples of preferred active non-metallic halides include hydrogen chloride, hydrogen bromide, t-butyl chloride, t-amyl bromide, allyl chloride, benzyl chloride, crotyl chloride, methylvinyl carbinyl chloride, α-phenylethyl bromide, diphenyl methyl chloride and the like. Most preferred are hydrogen chloride, t-butyl chloride, allyl chloride and benzyl chloride.

Suitable metallic halides which can be employed herein include those represented by the formula $MR_{y-a}X_a$ wherein M is a metal of Groups IIB, IIIA or IVA, of Mendeleev's Periodic Table of Elements, R is a monovalent organic radical, X is a halogen, y has a value corresponding to the valence of M and a has a value from 1 to y. Preferred metallic halides are aluminum halides of the formula $AlR_{3-a}X_a$ wherein each R is independently a hydrocarbyl group as hereinbefore defined such as alkyl; X is a halogen and a is a number from 1 to 3. Most preferred are alkylaluminum halides such as ethylaluminum sesquichloride, diethylaluminum chloride, ethylaluminum dichloride, and diethylaluminum bromide, with ethylaluminum dichloride being especially preferred. Alternatively, a metal halide such as stannic chloride, aluminum trichloride or a combination of aluminum trichloride with an alkyl aluminum halide or a trialkyl aluminum compound may be suitable employed.

Suitable transition metal compounds which can be employed herein include, for example, those represented by the general formulas $Tm(OR)_y(X)_x$ or $Tm(OR)_{x-2}O$ wherein Tm is a transition metal of Groups IVB, VB, VIB, VIIB or VIII of the Periodic Table of the Elements as published by the Sargent-Welch Scientific Company as catalog number S-18806; each R is hydrocarbyl or

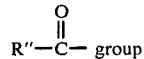

as previously described; R" is a hydrocarbyl or a hydrocarbyloxy group having from 1 to about 20, preferably from 1 to about 10 carbon atoms; X is a halogen, preferably chlorine or bromine; x has a value from zero to a value equal to the valence of Tm; y has a value from zero to a value equal to the valence of Tm and the sum of x+y is equal to the valence of Tm. Particularly suitable transition metal compounds include, for example, titanium tetrachloride, titanium trichloride, vanadium tetrachloride, zirconium tetrachloride, tetra(isopropoxy)-titanium, tetrabutoxytitanium, diethoxytitanium dibromide, dibutoxytitanium dichloride, tetraphenoxytitanium, tri-isopropoxy vanadium oxide, zirconium tetra-n-propoxide, mixtures thereof and the like.

Other suitable titanium compounds which can be employed as the transition metal component herein include those titanium complexes and/or compounds resulting from reacting (A) at least one titanium compound represented by the formula $Ti(OR)_xX_{4-x}$ wherein each R is independently a hydrocarbyl group having from 1 to about 20, preferably from about 1 to about 10, most preferably from about 2 to about 4 carbon atoms; X is a halogen and x has a value from zero to 4; with (B) at least one compound containing at least one aromatic hydroxyl group.

Particularly suitable are the bidentate ligand-containing titanium compounds represented by the formulas:

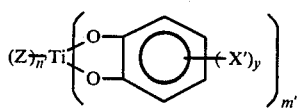

I.

wherein each Z is independently a halogen of an $R^2O$—group; each $R^2$ is independently a hydrocarbyl group having from 1 to about 20, preferably from 1 to about 10, most preferably from 2 to about 4 carbon atoms; each X' is independently a hydroxyl group, a nitro group, a nitrile group, a hydrocarbyl group, a hydrocarbyloxy group, a hydroxyl substituted hydrocarbyl or a hyroxyl substituted hydrocarbyloxy group each such groups having from 1 to about 20, preferably from 1 to about 12, carbon atoms or a halogen; m' has a value of 1 or 2; n' has a value of zero when m' has a value of 2; n' has a value of 2 when m' has a value of 1; and y has a value of from zero to 4.

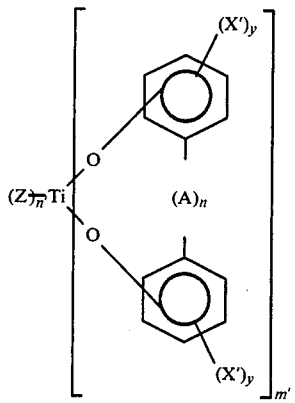

II.

wherein each A is independently a divalent hydrocarbyl group having from 1 to about 10, preferably from 1 to about 4, carbon atoms, —O—, —S—, —S—S—,

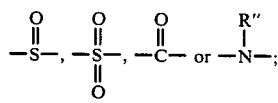

each R'' is independently hydrogen or a hydrocarbyl group having from 1 to about 10, preferably from 1 to about 6, carbon atoms; each Z is independently a halogen or an $R^2O$—group; each $R^2$ is independently a hydrocarbyl group having from 1 to about 20, preferably from about 1 to about 10, most preferably from 2 to about 4 carbon atoms; each X' is independently a hydroxyl group, a nitro group, a nitrile group, a hydrocarbyl group, a hydrocarbyloxy group, a hydroxyl substituted hydrocarbyl or a hydroxyl substituted hydrocarbyloxy group each such groups having from 1 to about 20, preferably from 1 to about 12, carbon atoms or a halogen; n has a value of zero or 1; m' has a value of 1 or 2; n' has a value of zero when m' has a value of 2 and a value of 2 when m' has a value of 1; and y has a value from zero to 4.

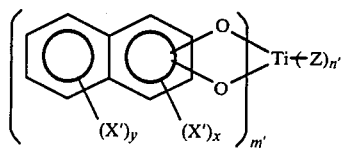

III.

wherein Z, X', m', n', and y are as defined above; and x has a value from zero to 2.

The foregoing catalyst components are combined in proportions sufficient to provide atomic ratios as previously mentioned.

In cases wherein the organomagnesium component and the halide source contains an insufficient quantity of aluminum, it is necessary to include in the total catalyst an aluminum compound such as an alkyl aluminum compound, e.g., a trialkyl aluminum, an alkyl aluminum halide or an aluminum halide. If polymerization temperatures below 180° C. are employed, the atomic ratios of Al:Ti may be from about 0.1:1 to about 200:1, preferably from 1:1 to about 200:1. However, when polymerization temperatures above 180° C. are employed, the Al:Ti ratio is less than 200:1, preferably less than 50:1. It is understood, however, that the use of very low amounts of aluminum necessitates the use of high purity solvents or diluents in the polymerization zone. Further, other components present in the zone should be essentially free of impurities which react with aluminum alkyls. Otherwise, additional quantities of an organometallic compound as previously described, preferably an organoaluminum compound, must be used to react with such impurities. Moreover, it is understood that in the catalyst the aluminum compound should be in the form of trialkyl aluminum or alkyl aluminum halide provided that the alkyl aluminum halide be substantially free of alkyl aluminum dihalide. In the above mentioned aluminum compounds, the alkyl groups independently have from 1 to about 20, preferably from 1 to about 10 carbon atoms.

When additional quantities of aluminum compound are employed, it can be added to the aforementioned catalyst during the preparation thereof or the aluminum deficient catalyst can be mixed with the appropriate aluminum compound prior to entry into the polymerization reactor or, alternatively, the aluminum deficient catalyst and the aluminum compound can be added to the polymerization reactor as separate streams or additions.

The foregoing catalytic reaction product is preferably prepared in the presence of an inert diluent. The concentrations of catalyst components are preferably such that when the essential components of the catalytic reaction product are combined, the resultant slurry is from about 0.005 to about 1.0 molar (moles/liter) with respect to magnesium. By way of an example of suitable inert organic diluents can be mentioned liquified ethane, propane, isobutane, n-butane, n-hexane, the various isomeric hexanes, isooctane, paraffinic mixtures of alkanes having from 8 to 12 carbon atoms, cyclohexane, methylcyclopentane, dimethylcyclohexane, dodecane, industrial solvents composed of saturated or aromatic hydrocarbons such as kerosene, naphthas, etc., especially when freed of any olefin compounds and other impurities, and especially those having boiling points in the range from about −50° to about 200° C. Also included as suitable inert diluents are benzene, toluene, ethylbenzene, cumene, decalin and the like.

Mixing of the catalyst components to provide the desired catalytic reaction product is advantageously prepared under an inert atmosphere such as nitrogen, argon or other inert gas at temperatures in the range from about −100° to about 200° C., preferably from about −20° to about 100° C., provided that the magnesium halide support is prepared such that the reaction temperature does not exceed about 60° C. The period of mixing is not considered to be critical as it is found that a sufficient catalyst composition most often occurs within about 1 minute or less. In the preparation of the catalytic reaction product, it is not necessary to separate hydrocarbon soluble components from hydrocarbon insoluble components of the reaction product.

In order to maximize catalyst efficiency, the catalyst is prepared by mixing the components of the catalyst in an inert liquid diluent in the following especially preferred order: organomagnesium component, halide source, additional halide source, if required, the transition metal compound and additional aluminum compound, if required.

In the polymerization process employing the aforementioned catalytic reaction product, polymerization is effected by adding a catalytic amount of the above catalyst composition to a polymerization zone containing polymerizable monomers, or vice versa. The polymerization zone is maintained at temperatures in the range from about 0° to about 300° C., preferably at solution polymerization temperatures, e.g., from about 130° to about 250° C., for a residence time of about a few seconds to several days, preferably 15 seconds to 2 hours. It is generally desirable to carry out the polymerization in the absence of moisture and oxygen and a catalytic amount of the catalytic reaction product is generally within the range from about 0.0001 to about 0.1 millimoles titanium per liter of diluent. It is understood, however, that the most advantageous catalyst concentration will depend upon polymerization conditions such as temperature, pressure, solvent and presence of catalyst poisons and that the foregoing range is given to obtain maximum catalyst yields in weight of polymer per unit weight of titanium. Generally, in the polymerization process, a carrier which may be an inert organic diluent or solvent or excess monomer is employed. In order to realize the full benefit of the high efficiency catalyst of the present invention, care must be taken to avoid oversaturation of the solvent with polymer. If such saturation occurs before the catalyst becomes depleted, the full efficiency of the catalyst is not realized. For best results, it is preferred that the amount of polymer in the carrier not exceed about 50 weight percent based on the total weight of the reaction mixture.

It is understood that inert diluents employed in the polymerization recipe are suitably as defined hereinbefore.

The polymerization pressures preferably employed are relatively low, e.g., from about 50 to about 1000 psig (345 to 6895 kPa), especially from about 100 to about 700 psig (690 to 4826 kPa). However, polymerization within the scope of the present invention can occur at pressures from atmospheric up to pressures determined by the capabilities of the polymerization equipment which can be as high as 70,000 psig (482636 kPa) and above. During polymerization it is desirable to agitate the polymerization recipe to obtain better temperature control and to maintain uniform polymerization mixtures throughout the polymerization zone. This can be accomplished within stirred autoclave type reactors or tubular type reactors wherein agitation is accomplished by turbulent flow characteristics.

In order to optimize catalyst yields in the polymerization of ethylene, it is preferable to maintain an excess ethylene concentration in the solvent, if employed, in the range of from about 1 to about 10 weight percent, most advantageously from about 1.2 to about 2 weight percent. To achieve this, when an excess of ethylene is fed into the system, a portion of the ethylene can be vented and/or recycled.

Hydrogen can be employed in the practice of this invention to control the molecular weight of the resultant polymer. For the purpose of this invention, it is beneficial to employ hydrogen in concentrations ranging from about 0.0001 to about 1 mole per mole of monomer. The larger amounts of hydrogen within this range are found to produce generally lower molecular weight polymers. It is understood that hydrogen can be added with a monomer stream to the polymerization vessel or separately added to the vessel before, during or after addition of the monomer to the polymerization vessel, but during or before the addition of the catalyst.

The monomer or mixture of monomers is contacted with the catalytic reaction product in any conventional manner, preferably by bringing the catalytic reaction product and monomer or mixture of monomers together with intimate agitation provided by suitable stirring or other means. Agitation can be continued during polymerization, or in some instances, the polymerization can be allowed to remain unstirred while the polymerization takes place. In the case of more rapid reactions with more active catalysts, means can be provided for refluxing monomer and solvent, if any of the latter is present, in order to remove the heat of reaction. If desired, heat exchangers can be employed for this purpose. In any event, adequate means should be provided for dissipating the exothermic heat of polymerization. If desired, the monomer can be brought in the vapor phase into contact with the catalytic reaction product, in the presence or absence of liquid material. The polymerization can be effected in the batch manner, or in a continuous manner, such as, for example, by passing the reaction mixture through an elongated reaction tube which is contacted externally with suitable cooling media to maintain the desired reaction temperature, or by passing the reaction mixture through an equilibrium overflow reactor or a series of the same.

The polymer is readily recovered from the polymerization mixture by driving off unreacted monomer and solvent if any is employed. No further removal of catalyst residues is required. Thus, a significant advantage of the present invention is the elimination of the catalyst residue removal steps. In some instances, however, it may be desirable to add a small amount of a catalyst deactivating reagent of the types conventionally employed for deactivating Ziegler catalysts. The resultant polymer is found to contain insignificant amounts of catalyst residue.

The following examples are given to illustrate the invention, and should not be construed as limiting its scope. All percentages are by weight and all parts are by molar or atomic ratio unless otherwise indicated.

EXAMPLE 1

A. Preparation of Magnesium Halide Support

Anhydrous electronic grade hydrogen chloride (~0.6 g at a rate of 3.6 g/hr, 0.001 g/s) was added to a solution (50 ml) of n-butyl-sec-butyl magnesium (0.15M) and triethylaluminum (0.012M) in purified ISOPAR ® E. Hydrogen chloride addition was continued until all free metal alkyl was converted to the metal chloride at a temperature of from 22° to 55° C.

B. Catalyst Preparation

An aliquot (8.00 ml) of the above prepared magnesium chloride support-ISOPAR ® E slurry was diluted with purified ISOPAR ® E followed by the sequential addition of ethylaluminum dichloride (0.03 ml of 1.0M), tetraisopropyltitanate (1.2 ml of 0.025M) and triethylaluminum (0.49 ml of 0.97M). The final volume was 100 ml. Resulting catalyst molar ratios were 40 Mg/90 Cl/20 Al/1 Ti.

C. Polymerization

A stirred batch reactor containing 2.0 liters of ISOPAR ® E was heated to 180° C. The solvent vapor pressure was 50 psig (345 kPa). To this was added 15 psig (103 kPa) of hydrogen and 135 psig (931 kPa) of ethylene for a total reactor pressure of 200 psig (1379 kPa). An amount of the above prepared catalyst was injected into the reactor (20 ml=0.006 m Moles Ti) and the reactor pressure was maintained at 200 psig (1379 kPa) with ethylene. The total reaction time was 20 minutes (1200 seconds). The catalyst efficiency is given in the Table.

EXAMPLE 2

Example 1 was repeated. The results are given in the Table.

COMPARATIVE EXPERIMENT A

A. Preparation of Magnesium Halide Support

Anhydrous electronic grade hydrogen chloride (~0.6 g at a rate of 3.6 g/hr, 0.001 g/sec) was added to a solution of n-butyl-sec-butyl magnesium (50 ml, 0.15M in purified ISOPAR ® E) until all of the magnesium alkyl was converted to magnesium chloride at a temperature of from 22° to 30° C.

B. Catalyst Preparation

An aliquot (8.00 ml) of the above prepared magnesium chloride support-ISOPAR ® E slurry was then diluted with purified ISOPAR ® E followed by the addition of ethylaluminum dichloride (EADC) (0.15 ml of 1.0M), tetraisopropyltitanate (TiPT) (1.2 ml of 0.025M) and triethylaluminum (TEA) (0.46 ml of 0.97M). The final volume was 100 ml. Resulting catalyst molar ratios were 40 Mg/90 Cl/20 Al/1 Ti.

C. Polymerization

A stirred batch reactor containing 2.0 liters of ISOPAR ® E was heated to 180° C. The solvent vapor pressure was 50 psig (345 kPa). To this was added 15 psig (103 kPa) of hydrogen and 135 psig (931 kPa) of ethylene for a total reactor pressure of 200 psig (1379 kPa). An amount of the above prepared catalyst was injected into the reactor (20 ml=0.006 m Moles Ti) and the reactor pressure was maintained at 200 psig (1379 kPa) with ethylene. The total reaction time was 20 minutes (1200 seconds). The catalyst efficiency is given in the Table.

COMPARATIVE EXPERIMENT B

The procedures of Comparative Experiment A were followed except that the magnesium chloride support was prepared at a temperature of from 66° C. to 90° C. instead of from 22° C. to 30° C.

COMPARATIVE EXPERIMENT C

The procedures of Comparative Experiment A were followed except that the magnesium chloride support was prepared at a temperature of from 0° C. to 5° C. instead of from 22° C. to 30° C.

COMPARATIVE EXPERIMENTS D & E

The procedures of Example 1 were followed except that the magnesium chloride support was prepared at a temperature of from 72° C. to 95° C. instead of 22° C. to 55° C.

EXAMPLE 3

A. Preparation of Magnesium Halide Support

Anhydrous electronic grade hydrogen chloride (~0.6 g at a rate of 3.6 g/hr, 0.001 g/sec) was added to a solution (50 ml) of n-butyl-sec-butyl magnesium (0.15M) and triethylaluminum (0.012M) in purified ISOPAR ® E. Hydrogen chloride addition was continued until all free metal alkyl was converted to the metal chloride at temperatures from 25° to 60° C.

B. Catalyst Preparation

An aliquot (4.00 ml) of the above prepared magnesium chloride-ISOPAR ® E slurry was diluted with purified ISOPAR ® E followed by the sequential addition of ethylaluminum dichloride (0.08 ml of 1.0M), tetraisopropyltitanate (0.60 ml of 0.025M) and triethylaluminum (0.15 ml of 0.97M). The final volume was 100 ml. Resulting catalyst molar ratios were 40 Mg/99 Cl/18 Al/1 Ti.

C. Polymerzation

A stirred batch reactor containing 2.0 liters of ISOPAR ® E was heated to 200° C. The solvent vapor pressure was 70 psig (483 kPa). To this was added 10 psig (69 kPa) of hydrogen and 322 psig (2220 kPa) of ethylene for a total reactor pressure of 400 psig (2758 kPa). An amount of the above prepared catalyst was injected into the reactor (25 ml=0.00375 m Moles Ti) and the reactor pressure was maintained at 400 psig (2758 kPa) with ethylene. The total reaction time was 15 minutes (900 seconds). The catalyst efficiency is given in the Table.

EXAMPLE 4

The procedures of Example 3 were followed except that the magnesium chloride support was prepared at a temperature of 0° C. to 5° C. instead of 25° C. to 60° C.

COMPARATIVE EXPERIMENT F

A. Preparation of Magnesium Halide Support

Anhydrous electronic grade hydrogen chloride (~0.6 g at a rate of 3.6 g/hr, 0.001 g/sec) was added to a solution (50 ml) of n-butyl-sec-butyl magnesium (0.15M) in purified ISOPAR ® E. Hydrogen chloride addition was continued until all free metal alkyl was converted to the metal chloride at temperatures from 25° to 55° C.

B. Catalyst Preparation

An aliquot (4.00 ml) of the above prepared magnesium chloride-ISOPAR ® E slurry was diluted with purified ISOPAR ® E followed by the sequential addition of ethylaluminum dichloride (0.08 ml of 1.0M), tetraisopropyltitanate (0.60 ml of 0.025M) and triethylaluminum (0.15 ml of 0.97M). The final volume was 100 ml. Resulting catalyst molar ratios were 40 Mg/90 Cl/15 Al/1 Ti.

C. Polymerization

The procedure of Example 3-C was followed.

EXAMPLE 5

A. Preparation of Magnesium Halide Support

Anhydrous electronic grade hydrogen chloride (~0.6 g at a rate of 3.6 g/hr, 0.001 g/sec) was added to a solution (50 ml) of n-butyl-sec-butyl magnesium (0.15M) and triethylaluminum (0.019M) in purified ISOPAR ® E. Hydrogen chloride addition was continued until all free metal alkyl was converted to the metal chloride at temperatures from 22° to 57° C.

B. Catalyst Preparation

An aliquot (4.00 ml) of the above prepared magnesium chloride-ISOPAR ® E slurry was diluted with purified ISOPAR ® E followed by the sequential addition of tetraisopropyltitanate (0.60 ml of 0.025M) and triethylaluminum (0.15 ml of 0.97M). The final volume was 100 ml. Resulting catalyst molar ratios were 40 Mg/95 Cl/15 Al/1 Ti.

C. Polymerization

The procedure of Example (3-C) was followed.

COMPARATIVE EXPERIMENT G

A. Preparation of Magnesium Halide Support

Anhydrous electronic grade hydrogen chloride (~0.6 g at a rate of 3.6 g/hr, 0.001 g/sec) was added to a solution (50 ml) of n-butyl-sec-butyl magnesium (0.15M) in purified ISOPAR ® E. Hydrogen chloride addition was continued until all free metal alkyl was converted to the metal chloride at temperatures from 25° to 52° C.

B. Catalyst Preparation

An aliquot (4.00 ml) of the above prepared magnesium chloride-ISOPAR ® E slurry was diluted with purified ISOPAR ® E followed by the sequential addition of ethylaluminum dichloride (0.08 ml of 1.0M), tetraisopropyltitanate (0.60 ml of 0.025M) and triethylaluminum (0.15 ml of 0.97M). The final volume was 100 ml. Resulting catalyst molar ratios were 40 Mg/90 Cl/15 Al/1 Ti.

C. Polymerization

The procedure of Example (3-C) was followed.

COMPARATIVE EXPERIMENT H

The procedure of Comparative Experiment G was followed except that the magnesium chloride support was prepared at 25° to 56° C. instead of 25° to 52° C.

COMPARATIVE EXPERIMENT I

The procedure of Comparative Experiment G was followed except that the magnesium chloride support was prepared at 75° to 92° C. instead of 25° to 52° C.

COMPARATIVE EXPERIMENT J

The procedure of Comparative Experiment G was followed except that the magnesium chloride support was prepared at 75° to 95° C. instead of 25° to 52° C.

EXAMPLE 6

A. Preparation of Magnesium Halide Support

Anhydrous electronic grade hydrogen chloride (~0.6 g at a rate of 3.6 g/hr, 0.001 g/sec) was added to a solution (50 ml) of n-butyl-sec-butyl magnesium (0.15M) and triethylaluminum (0.00375M) in purified ISOPAR ® E. Hydrogen chloride addition was continued until all free metal alkyl was converted to the metal chloride at temperatures from 25° to 59° C.

B. Catalyst Preparation

An aliquot (4.00 ml) of the above prepared magnesium chloride-ISOPAR ® E slurry was diluted with purified ISOPAR ® E followed by the sequential addition of ethylaluminum dichloride (0.06 ml of 1.0M), tetraisopropyltitanate (0.60 ml of 0.025M) and triethylaluminum (0.16 ml of 0.97M). The final volume was 100 ml. Resulting catalyst molar ratios were 40 Mg/90 Cl/15 Al/1 Ti.

C. Polymerization

The procedure of Example (3-C) was followed.

EXAMPLE 7

A. Preparation of Magnesium Halide Support

Anhydrous electronic grade hydrogen chloride (~0.6 g at a rate of 3.6 g/hr, 0.001 g/sec) was added to a solution (50 ml) of butylethylmagnesium (0.15M) and triethylaluminum (0.0049M) in purified ISOPAR ® E. Hydrogen chloride addition was continued until all free metal alkyl was converted to the metal chloride at temperatures from 25° to 50° C.

B. Catalyst Preparation

An aliquot (4.00 ml) of the above prepared magnesium chloride-ISOPAR ® E slurry was diluted with purified ISOPAR ® E followed by the sequential addition of ethylaluminum dichloride (0.05 ml of 1.0M), tetraisopropyltitanate (0.60 ml of 0.025M) and triethylaluminum (0.16 ml of 0.97M). The final volume was 100 ml. Resulting catalyst molar ratios were 40 Mg/90 Cl/15 Al/1 Ti.

C. Polymerization

The procedure of Example (3-C) was followed.

EXAMPLE 8

The procedure of Example 7 was repeated.

COMPARATIVE EXPERIMENT K

The procedure of Example 6 was followed except that the magnesium chloride support was prepared at 85° to 105° C. instead of 25° to 59° C.

COMPARATIVE EXPERIMENT L

The procedure of Comparative Experiment K was followed except that the magnesium chloride support was prepared at 75° to 105° C. instead of 85° to 105° C.

COMPARATIVE EXPERIMENT M

The procedure of Example 7 was followed except that the magnesium chloride support was prepared at 75° to 82° C. instead of 25° to 50° C.

COMPARATIVE EXPERIMENT N

The procedure of Comparative Experiment M was repeated except that the magnesium chloride support was prepared at 80° to 95° C. instead of 75° to 82° C.

| EXAMPLE OR COMPARATIVE EXPERIMENT NO. | MgCl₂ PREPARATION | | CATALYST ATOMIC RATIO Mg/Cl*/Al/Ti | POLYMERIZATION CONDITIONS | | |
|---|---|---|---|---|---|---|
| | TEMP. °C. | ATOMIC RATIO Al/Mg | | TEMP. °C. | TOTAL PRESSURE psig/kPa | EFFICIENCY g P/g Ti |
| Ex. 1 | 22–55 | 0.08/1 | 40/90/20/1 | 180 | 200/1379 | 639,000 |
| Ex. 2 | " | " | " | " | " | 639,000 |
| C.E. A | 22–30 | 0 | 40/90/20/1 | " | " | 527,000 |
| C.E. B | 66–90 | 0 | " | " | " | 533,000 |
| C.E. C | 0–5 | 0 | " | " | " | 534,000 |
| C.E. D | 72–95 | 0.08/1 | " | " | " | 392,000 |
| C.E. E | " | " | " | " | " | 478,000 |
| Ex. 3 | 25–60 | " | 40/99/18/1 | 200 | 400/2758 | 686,000 |
| C.E. F | 22–55 | 0 | 40/90/15/1 | " | " | 614,000 |
| Ex. 4 | 0–5 | 0.08/1 | 40/99/18/1 | " | " | 919,000 |
| Ex. 5 | 22–57 | 0.127/1 | 40/95/15/1 | " | " | 740,000 |
| Ex. 6 | 25–59 | 0.025/1 | 40/90/15/1 | " | " | 612,000 |
| Ex. 7 | 25–50 | 0.033/1 | " | " | " | 634,000 |
| Ex. 8 | " | " | " | " | " | 675,000 |
| C. E. G | 25–52 | 0 | " | " | " | 558,000 |
| C. E. H | 25–56 | " | " | " | " | 573,000 |
| C. E. I | 75–92 | " | " | " | " | 559,000 |
| C. E. J | 75–95 | " | " | " | " | 634,000 |
| C. E. K | 85–105 | 0.025/1 | " | " | " | 561,000 |
| C. E. L | 75–105 | " | " | " | " | 537,000 |
| C. E. M | 75–82 | 0.033/1 | " | " | " | 569,000 |
| C. E. N | 80–95 | " | " | " | " | 517,000 |

*Total chloride

We claim:

1. In a catalyst support prepared by contacting in the absence of an electron donor a hydrocarbon soluble magnesium component represented by the formula R₂Mg.xAlR'₃ with a non-metallic halide source; the improvement which comprises (1) employing as the magnesium component that which is represented by the above formula wherein each R is independently a hydrocarbyl or hydrocarbyloxy group having from 1 to about 20 carbon atoms, each R' is independently a halide, a hydrocarbyl or hydrocarbyloxy group having from 1 to about 20 carbon atoms

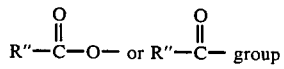

wherein R" is a hydrocarbyl or hydrocarbyloxy group having from about 1 to about 20 carbon atoms; and the value of x is such that the atomic ratio of Al:Mg is from about 0.025:1 to 0.25:1 and (2) the magnesium component and the halide source are contacted in such a manner that the reaction temperature does not exceed about 25° C.

2. A catalyst support of claim 1 wherein the atomic ratio of Al:Mg is from about 0.025:1 to about 0.125:1 and the reaction temperature does not exceed about 10° C.

3. A catalyst support of claim 1 wherein each R group attached to the magnesium atom is independently an ethyl, n-butyl, sec-butyl, n-hexyl, sec-hexyl, n-octyl or sec-octyl group; each of the three R' groups attached to the aluminum atom is independently an alkyl, alkoxy or halide group and said halide source is hydrogen chloride.

4. A catalyst support of claim 2 wherein each R group attached to the magnesium atom is independently an ethyl, n-butyl, sec-butyl, n-hexyl, sec-hexyl, n-octyl or sec-octyl group; each of the three R' groups attached to the aluminum atom is independently an alkyl, alkoxy or halide group and said halide source is hydrogen chloride.

5. In a magnesium halide supported transition metal catalyst comprising a magnesium halide and a transition metal component; the improvement which comprises employing as the magnesium halide support that which is prepared by contacting in the absence of an electron donor a magnesium component represented by the formula R₂Mg.xAlR'₃ wherein each R is independently a hydrocarbyl or hydrocarbyloxy group having from 1 to about 20 carbon atoms, each R' is independently a halide, a hydrocarbyl or hydrocarbyloxy group having from 1 to about 20 carbon atoms,

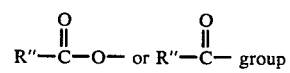

wherein R" is a hydrocarbyl or hydrocarbyloxy group having from about 1 to about 20 carbon atoms and x has a value such that the atomic ratio of Al:Mg is from about 0.025:1 to about 0.25:1 with a non-metallic halide source in a manner such that the reaction temperature does not exceed 25° C.

6. A catalyst of claim 5 wherein x has a value such that the atomic ratio of Al:Mg is from about 0.025:1 to about 0.125:1; said reaction temperature does not exceed about 10° C.; said halide source is hydrogen chloride and said transition metal is titanium.

7. A catalyst of claim 5 wherein each R group attached to the magnesium atom is independently an ethyl, n-butyl, sec-butyl, n-hexyl, sec-hexyl, n-octyl or sec-octyl group; each of the three R' groups attached to the aluminum atom is independently an alkyl, alkoxy or halide group and said halide source is hydrogen chloride and said transition metal component is a titanium compound.

8. A catalyst of claim 7 wherein $R_2Mg$ is n-butyl-sec-butyl magnesium, n-butyl-n-octyl magnesium, or n-butyl-ethyl magnesium, sec-butyl-n-octyl magnesium, sec-butyl-n-octyl magnesium, sec-butyl-sec-octyl magnesium, or di-n-hexyl magnesium and said transition metal component is tetraisopropyl titanate.

9. A catalyst of claim 7 wherein said transition metal component is represented by Formulas (I), (II) or (III) as shown in the specification wherein each Z is independently a halogen or an $R^2O$—group; each $R^2$ is independently a hydrocarbyl group having from 1 to about 20, carbon atoms; each X' is independently a hydroxyl group, a nitro group, a nitrile group, a hydrocarbyl group, a hydrocarbyloxy group, a hydroxyl substituted hydrocarbyl or a hydroxyl substituted hydrocarbyloxy group each such groups having from 1 to about 20, carbon atoms or a halogen; m' has a value of 1 or 2; n' has a value of zero when m' has a value of 2; n' has a value of 2 when m' has a value of 1; x has a value of from zero to 2; and y has a value of from zero to 4.

10. A catalyst of claim 6 wherein each R group attached to the magnesium atom is independently an ethyl, n-butyl, sec-butyl, n-hexyl, sec-hexyl, n-octyl or sec-octyl group; each of the three R' groups attached to the aluminum atom is independently an alkyl, alkoxy or halide group.

11. A catalyst of claim 10 wherein $R_2Mg$ is n-butyl-sec-butyl magnesium, n-butyl-n-octyl magnesium, or n-butyl-ethyl magnesium, sec-butyl-n-octyl magnesium, sec-butyl-n-octyl magnesium, sec-butyl-sec-octyl magnesium, or di-n-hexyl magnesium and said transition metal component is tetraisopropyl titanate.

12. A catalyst of claim 10 wherein said transition metal component is represented by Formulas (I), (II) or (III) as shown in the specification wherein each Z is independently a halogen or an $R^2O$—group; each $R^2$ is independently a hydrocarbyl group having from 1 to about 20, carbon atoms; each X' is independently a hydroxyl group, a nitro group, a nitrile group, a hydrocarbyl group, a hydrocarbyloxy group, a hydroxyl substituted hydrocarbyl or a hydroxyl substituted hydrocarbyloxy group each such groups having from 1 to about 20, carbon atoms or a halogen; m' has a value of 1 or 2; n' has a value of zero when m' has a value of 2; n' has a value of 2 when m' has a value of 1; x has a value of from zero to 2; and y has a value of from zero to 4.

13. A catalyst composition comprising the product which results from combining
 (A) a magnesium halide prepared by contacting in the absence of an electron donor
  (1) at least one hydrocarbon soluble magnesium component represented by the general formula $R_2Mg\cdot xAlR'_3$ wherein each R is independently a hydrocarbyl or hydrocarbyloxy group having from 1 to about 20, each R' is independently a halide, a hydrocarbyl or hydrocarbyloxy group having from 1 to about 20 carbon atoms,

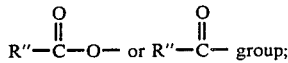

R" is a hydrocarbyl or a hydrocarbyloxy group having from 1 to about 20 carbon atoms; and x has a value such that the atomic ratio of Al:Mg is from about 0.025:1 to about 0.25:1; and
  (2) at least one non-metallic halide source under conditions such that the reaction temperature does not exceed about 25° C.;
 (B) at least one transition metal compound represented by the formula $Tm(OR)_yX_{y-x}$ or $Tm(OR)_{x-2}O$ wherein Tm is a metal of Groups IVB, VB, VIB, VIIB or VIII of the Periodic Table; R is a hydrocarbyl group having from 1 to about 20 carbon atoms or a

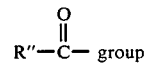

wherein R" is a hydrocarbyl or a hydrocarbyloxy group having from 1 to about 20 carbon atoms; x and y each independently have values from zero up to the valence of Tm and x+y has a value equal to the valence of Tm;
 (C) an additional halide source if an insufficient quantity of component (A2) is present to provide the desired excess X:Mg ratio;
 (D) an organoaluminum compound, if components (A1) and (A2) are not present in quantities sufficient to provide the desired Al:Tm ratio; and wherein
  (1) the Mg:Tm atomic ratio is from about 2:1 to about 200:1;
  (2) the Al:Tm atomic ratio is from about 0.1:1 to about 200:1;
  (3) excess X:Mg ratio is from about 0.001:1 to about 100:1.

14. A catalyst of claim 13 wherein
 (i) in component (A), the atomic ratio of Al:Mg is from about 0.025:1 to about 0.125:1; the reaction temperature does not exceed about 10° C. and said halide source is hydrogen chloride;
 (ii) in component (B), Tm is titanium; and
 (iii) component (C), if present, is an alkyl aluminum halide;
 (iv) component (D), if present, is a trialkyl aluminum compound;
 (v) the Mg:Tm atomic ratio is from about 5:1 to about 70:1;
 (vi) the Al:Tm atomic ratio is from about 1:1 to about 50:1; and
 (vii) the excess X:Mg ratio is from about 0.01:1 to about 50:1.

15. A catalyst of claim 14 wherein
 (i) the Mg:Tm atomic ratio is from about 10:1 to about 50:1;
  (ii) the Al:Tm atomic ratio is from about 5:1 to about 30:1; and
   (iii) the excess X:Mg ratio is from about 0.1:1 to about 5:1.

16. A catalyst of claim 13 wherein
 (i) in component (A), each R group attached to a magnesium atom is independently an ethyl, n-butyl, sec-butyl, n-hexyl, sec-hexyl, n-octyl or sec-octyl group; each of the three R' groups attached to the aluminum atom is independently an alkyl, alkoxy or halide group and said halide source is hydrogen chloride;

(ii) in component (B), Tm is tetravalent titanium;

(iii) component (C), if present, is ethyl aluminum dichloride; and (iv) component (D), if present, is triethyl aluminum.

17. A catalyst or claim 16 wherein (i) $R_2Mg$ is n-butyl-sec-butyl magnesium, n-butyl-n-octyl magnesium, or n-butyl-ethyl magnesium, sec-butyl-n-octyl magnesium, sec-butyl-n-octyl magnesium, sec-butyl-sec-octyl magnesium, or di-n-hexyl magnesium;

(ii) component (B) is tetraisopropyltitanate.

18. A catalyst of claim 16 wherein component B is a transition metal component represented by Formulas (I), (II) or (III) as shown in the specification wherein each Z is independently a halogen or an $R_2O$—group; each $R^2$ is independently a hydrocarbyl group having from 1 to about 20, carbon atoms; each X' is independently a hydroxyl group, a nitro group, a nitrile group, a hydrocarbyl group, a hydrocarbyloxy group, a hydroxyl substituted hydrocarbyl or a hydroxyl substituted hydrocarbyloxy group each such groups having from 1 to about 20, carbon atoms or a halogen; m' has a value of 1 or 2; n' has a value of zero when m' has a value of 2; n' has a value of 2 when m' has a value of 1; x has a value of from zero to 2; and y has a value of from zero to 4.

19. A catalyst of claim 14 wherein (i) in component (A), each R group attached to a magnesium atom is independently an ethyl, n-butyl, sec-butyl, n-hexyl, sec-hexyl, n-octyl or sec-octyl group; each of the three R' groups attached to the aluminum atom is independently an alkyl, alkoxy or halide group;

(ii) in component (B), Tm is tetravalent titanium;

(iii) component (C), if present, is ethyl aluminum dichloride; and (iv) component (D), if present, is triethyl aluminum.

20. A catalyst of claim 19 wherein (i) $R_2Mg$ is n-butyl-sec-butyl magnesium, n-butyl-n-octyl magnesium, or n-butyl-ethyl magnesium, sec-butyl-n-octyl magnesium, sec-butyl-n-octyl magnesium, sec-butyl-sec-octyl magnesium, or di-n-hexyl magnesium; and (ii) component (B) is tetraisopropyltitanate.

21. A catalyst of claim 19 wherein component B is a transition metal component represented by Formulas (I), (II) or (III) as shown in the specification wherein each Z is independently a halogen or an $R^2O$—group; each $R^2$ is independently a hydrocarbyl group having from 1 to about 20, carbon atoms; each X' is independently a hydroxyl group, a nitro group, a nitrile group, a hydrocarbyl group, a hydrocarbyloxy group, a hydroxyl substituted hydrocarbyl or a hydroxyl substituted hydrocarbyloxy group each such groups having from 1 to about 20, carbon atoms or a halogen; m' has a value of 1 or 2; n' has a value of zero when m' has a value of 2; n' has a value of 2 when m' has a value of 1; x has a value of from zero to 2; and y has a value of from zero to 4.

22. A catalyst of claim 15 wherein (i) in component (A), each R group attached to a magnesium atom is independently an ethyl, n-butyl, sec-butyl, n-hexyl, sec-hexyl, n-octyl or sec-octyl group; each of the three R' groups attached to the aluminum atom is independently an alkyl, alkoxy or halide group;

(ii) in component (B), Tm is tetravalent titanium;

(iii) component (C), if present, is ethyl aluminum dichloride; and (iv) component (D), if present, is triethtyl aluminum.

23. A catalyst of claim 22 wherein (i) $R_2Mg$ is n-butyl-sec-butyl magnesium, n-butyl-n-octyl magnesium, or n-butyl-ethyl magnesium, sec-butyl-n-octyl magnesium, sec-butyl-n-octyl magnesium, sec-butyl-sec-octyl magnesium, or di-n-hexyl magnesium; and (ii) component (B) is tetraisopropyltitanate.

24. A catalyst of claim 22 wherein component B is a transition metal component represented by Formulas (I), (II) or (III) as shown in the specification wherein each Z is independently a halogen or an $R^2O$—group; each $R^2$ is independently a hydrocarbyl group having from 1 to about 20, carbon atoms; each X' is independently a hydroxyl group, a nitro group, a nitrile group, a hydrocarbyl group, a hydrocarbyloxy group, a hydroxyl substituted hydrocarbyl or a hydroxyl substituted hydrocarbyloxy group each such groups having from 1 to about 20, carbon atoms or a halogen; m' has a value of 1 or 2; n' has a value of zero when m' has a value of 2; n' has a value of 2 when m' has a value of 1; x has a value of from zero to 2; and y has a value of from zero to 4.

* * * * *